Nov. 8, 1932.  J. N. SUTHERLAND  1,886,454
VALVE
Original Filed Nov. 13, 1929
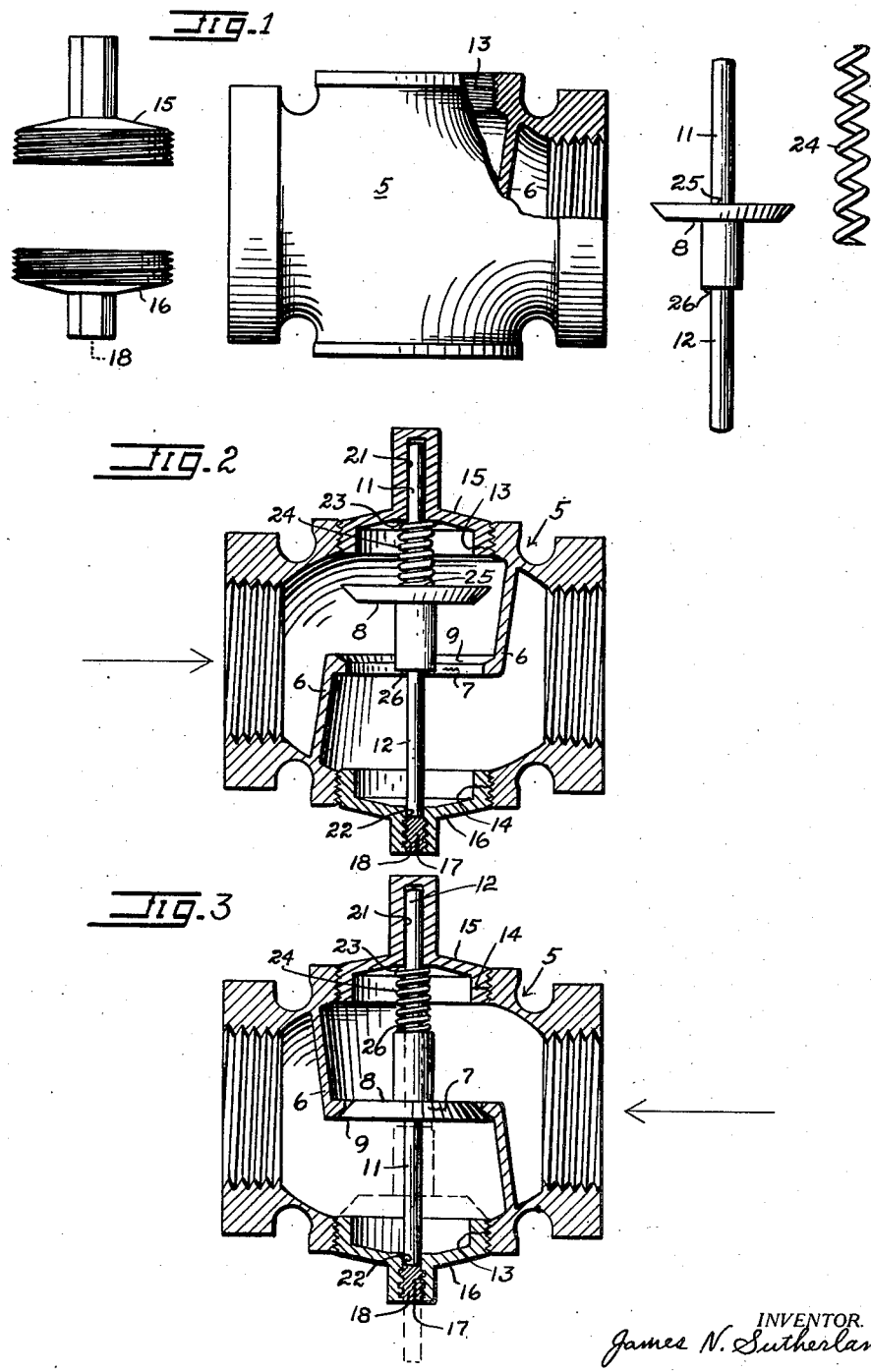
INVENTOR.
James N. Sutherland
BY M. C. Frank
ATTORNEY.

Patented Nov. 8, 1932

1,886,454

UNITED STATES PATENT OFFICE

JAMES N. SUTHERLAND, OF BERKELEY, CALIFORNIA

VALVE

Application filed November 13, 1929, Serial No. 406,799. Renewed August 17, 1932.

The invention relates to a thermo-controlled valve for automatic operation.

A general object of the invention is to provide a valve which, being primarily set in a normal open or shut condition thereof, is thereafter arranged to automatically assume the other condition by and upon the subjecting of the valve to a high temperature such as might be produced by a fire adjacent the valve. Another object of the invention is to provide a generally improved valve of the class described in which a fusible element is utilized to maintain the valve in a normal set condition, the fusing of said element permitting the valve to assume an abnormal setting therefor.

A further object of the invention is to provide for the use of a fusible element as aforesaid in such a manner that it is directly cooperative with the valve plug and requires the use neither of exposed strain members nor of a packing means in the valve structure.

Yet another object of the invention is to provide a valve structure wherein assembly of the parts thereof may be optionally made to provide either a normally open or normally closed fluid passage therethrough.

An added object of the invention is to bring about a new combination and correlation of parts in a device of the class described whereby marked economies in manufacture will be effected and the efficiency of the device will be enhanced.

The invention possesses other objects and features of advantage, some of which, with the foregoing, will be set forth or be apparent in the following description of a typical embodiment of the invention which is illustrated in the accompanying drawing, in which:

Figure 1 discloses the various parts of the valve in disassembled relation, the valve body being shown in partial section.

Figure 2 is a longitudinal section through an assembly of the parts wherein the valve is held open by a fusible element of the valve.

Figure 3 is a section showing the parts so assembled that the fusible element is operative to hold the valve shut.

In tank and pipe systems involving the retention and transmission of inflammable or explosive fluids, a primary requirement for protection against fire is usually the provision of normally open valves which are arranged to become automatically closed through the effect of a fire adjacent thereto. In some instances the opening of a normally closed valve is required under similar circumstances. It is noted that both types of valves are particularly usable in connection with pipe lines, tank farms, and refineries in the petroleum industries. Valves which open under undue temperature conditions are also essential parts of fire-protection sprinkling systems. The valve structure of the present invention is such that by an optional arrangement and use of the same parts thereof, either a normally open or normally closed valve may be assembled for use under the conditions to be met.

As illustrated, the invention is incorporated in the structure of a valve having a hollow body 5 providing a fluid passage therethrough, said passage having thereacross a partition 6 perforated to provide a port 7 connecting the passage portions of the valve body. An element 8 is provided for disposal to close or open the port 7. As particularly shown, the element 8 comprises a valve plug of frusto-conical outline, and the bore of the port 7 is formed to provide a plug seat 9 thereat; it is noted, however, that the exact type of closure for the port 7 is immaterial to the present invention. The closure element 8 is arranged for reciprocation between its port-closing and port-opening positions, and is provided with valve stem portions 11 and 12 extending axially and oppositely therefrom.

In the present instance the body 5 is generally globular in outline and is provided with internally threaded flanges at the ends of its fluid passage whereby it is arranged to be connected in a fluid line for operation therein. Openings 13 and 14 are provided through opposite sides of the body and in axial alignment with the valve stem, said openings being of like size and threaded for the interchangeable mounting therein of members 15 and 16. The member 16 is centrally perforated therethrough and the perforation 17 thereof is filled with a fusible element 18 which is arranged to melt at a relatively low temperature; the element 18 will usually be formed of a lead alloy which may readily be cast in the perforation 17, the bore of said perforation being preferably irregular whereby to anchor the fusible element against a pressure displacement thereof in the perforation. The bore 17 is large enough to slidably receive either stem end when the element 18 is removed therefrom.

When, as shown in Figure 2, the member 16 is mounted in the opening 14 of the valve body, the element 18 is arranged to engage the free end of the stem portion 12, and said stem portion is of such length that when it is so engaged by the fusible element, the valve plug 8 is held in unseated relation to the seat 9 and the valve is therefore open. If, on the other hand, and as shown in Figure 3, the member 16 should be mounted in the opening 13 of the valve body, the fusible element 18 is arranged to engage the free end of the valve stem portion 11 to fix the valve plug in seated engagement with the seat 9; it is noted that the threaded engagement of the member 16 in the opening 13 permits an adjusted pressure engagement of the valve plug with the seat, and that the valve body is preferably turned over whereby the member 16 will be at the lower side thereof to facilitate the escape of the element 18 when melted.

The member 15 provides an externally closed bore 21 for slidably receiving the stem end adjacent thereto when it is mounted at either of the body openings 13 or 14. The fusible element 18, it will now be noted, does not extend inwardly for the full length of the perforation 17 in which it is secured, whereby a socket 22 is defined in the member 16 for receiving the stem extremity engaged by the fusible element. The bore 21 of the member 15 is arranged to constantly engage the valve stem portion thereat for substantially all positions of the valve plug whereby said bore and the perforation 17 are constantly operative to restrain the valve plug for a solely axial movement thereof.

A spring seat 23 is provided at the inner end of the member 15, and a spring 24 is provided for engagement between said seat and the appropriate one of seats 25 and 26 provided on the valve plug. As shown, the spring 24 is helical for engagement about a stem portion, the seat 25 is provided at the base of the stem portion 11, and the seat 26 is provided at a point on the stem portion 12 somewhat removed from the plug proper. The stem portions 11 and 12 are, of course, of like size outwardly of said seats for their required engagement in the bore 21 of the member 15 and the perforation 17 of the member 16. The disposition of the seats 25 and 26 with respect to the valve plug is such as permits the use of the spring 24 in both said locations thereof.

Referring particularly to Figure 2, it is seen that the spring 24 is operative between the seats 23 and 25 to urge a closing of the valve. If now, the fusible element should be melted from the member 16, the valve is released to engage the valve seat 9, and the spring is then operative to close the valve and hold it closed, the stem portion 12 moving through the perforation of the member 16.

The connection of the valve in a fluid duct would, of course, be such that when the valve is closed, the pressure of the restrained fluid would hold the valve shut; an arrow indicates the direction of fluid flow before the valve is closed.

In Figure 3, on the other hand, a melting away of the fusible element frees the valve for opening, and the spring 24, which is engaged between the seat 23 and seat 26, is operative to open the valve to the position indicated in dash lines. In this case, the external connections for the valve would preferably be such that the pressure of the normally restrained fluid tends to open the valve; an arrow in Figure 3 indicates the direction of fluid flow after the valve assembly there shown is opened.

It will now be clear that to change from a valve assembly shown in Figure 2 to that shown in Figure 3, it is merely necessary to interchange the members 15 and 16 and shift the spring 24 to the opposite side of the valve plug. This interchangeable relation of parts in the structure is seen to provide two types of thermo-controlled valves with the same set of parts. Furthermore no elements extend at any time from the valve at the pressure side thereof and no packing for stems or other elements is required. The whole structure involves but five elements (the body 5, the closure element 8, the members 15 and 16, and the spring 24), thereby reducing manufacturing costs. A member 16 may readily be provided with a new fusible element 18 or replaced with another like member having the fusible element therein. At least the member 16 would be of heat-conducting material, and said member might be extended, or be of some special form, for conveying heat to the element 18 for melting the same. Under low pressure conditions, the element 18 might be formed of a non-metallic fusible material such as paraffine or the like.

From the foregoing description taken in connection with the accompanying drawing, the advantages of the construction and method of operation will be readily understood by those skilled in the art to which the invention apertains, and while I have described the principle of operation, together with the device which I now consider to be the best embodiment thereof, I desire to have it understood that the device shown is merely illustrative, and that such changes may be made, when desired, as fall within the scope of the appended claim.

Having thus described my invention, I claim as new and desire to secure by Letters Patent of the United States, the following:

In a valve, a body providing a fluid passage, a ported partition across said passage, a valve plug for engagement with the port of said passage and reciprocable between port-closing and port-opening positions thereof, said valve plug having valve stem portions extending coaxially and oppositely therefrom, said body being provided with perforations coaxial with and at opposite sides of said valve plug, a member closing a said perforation and having a hole formed therein in the axial line of said stem portions, corrugations in said hole, a fusible element cast in said hole and maintained therein by said corrugations, said fusible element engaging an immediately opposed said stem portion to dispose said valve plug in one of said positions thereof and to prevent its disposal in the other said position, a member engaging and sealing the other said perforation, and spring means operative between said last member and said valve plug to constantly urge the latter to assume the aforesaid other position thereof, said members being arranged for interchangeable mounting in said perforations whereby the valve may be maintained in either an open or a closed position by the fusible element.

In testimony whereof, I affix my signature.

JAMES N. SUTHERLAND.